(12) United States Patent
Yang

(10) Patent No.: US 6,687,019 B1
(45) Date of Patent: Feb. 3, 2004

(54) DEVICE AND METHOD OF PRINTING DATA IN MULTIPLE COPIES

(75) Inventor: Seung-Sik Yang, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/320,714

(22) Filed: May 27, 1999

(30) Foreign Application Priority Data

May 27, 1998 (KR) .............................. 98-19224

(51) Int. Cl.[7] .......................... G06F 15/00; G06K 1/00; G03G 15/00
(52) U.S. Cl. ...................... 358/1.15; 358/1.9; 399/402
(58) Field of Search ................ 358/1.1–1.18; 399/402

(56) References Cited

U.S. PATENT DOCUMENTS

| 5,838,883 A | * | 11/1998 | Pekelman ................ 395/106 |
| 6,035,103 A | * | 3/2000 | Zuber ..................... 395/109 |
| 2001/0012116 A1 | * | 8/2001 | Ichi et al. ................ 358/1.13 |
| 2001/0012400 A1 | * | 8/2001 | Wang et al. .............. 382/181 |

* cited by examiner

*Primary Examiner*—Mark Wallerson
*Assistant Examiner*—Saeid Ebrahim
(74) *Attorney, Agent, or Firm*—Robert E. Bushnell, Esq.

(57) ABSTRACT

A device and method of printing data in multiple copies in a collated or uncollated copy mode. A number of print copies, desired, is set and the data is converted to a predetermined format suitable for printing. The converted data is stored in a storage unit when the copy mode is the collated copy mode or directly printed when the copy mode is the uncollated copy mode.

12 Claims, 3 Drawing Sheets

DEVICE AND METHOD OF PRINTING DATA IN MULTIPLE COPIES

CLAIM OF PRIORITY

This application makes reference to, incorporates the same herein, and claims all benefits accruing under 35 U.S.C §119 from an application entitled Device And Method Of Printing Data In Multiple Copies earlier filed in the Korean Industrial Property Office on May. 27, 1998, and there duly assigned Ser. No. 98-19224 by that Office.

BACKGROUND OF THE INVENTION

1. Field of the Invention

The present invention relates to a device and method of printing a document in multiple copies, and more particularly, when using a printer to print multiple copies of document originating in a computer, instead of creating a print image each time a document, i.e.,data, is to be printed, by storing the data in a storage device and then printing according to a predetermined print quantity, i.e., number of copies, in order to increase printing speed.

2. Description of the Related Art

Generally, a printer is the most common device to review, store, and deliver a result from a computer in a printed document form to another person. Printers have become basic structural factors in multimedia, personal computers, facsimiles, electronic cash registers and automatic cash tellers; and currently, daisy wheel type printers, pin type printers, inkjet type printers, and laser type printers have been developed, and especially inkjet printers and laser printers are the most commonly distributed types.

Recently, along with fast developing office automation equipments such as scanner and facsimile, the demand for a printer is increasing and office automation equipment has been developed with high technology in order to expand its own functions. Moreover, separate pieces of office automation equipment are being combined into a single machine which alleviates users of an economical burden and requires less installation space, thus products with multi-document printing functions are being manufactured and sold.

The method of using the printer to print data in multiple copies is to set-up the printing copies in the printer driver, then select whether to print the data in a collated copy type or an uncollated copy type. The difference between collated copy and uncollated copy is as follows: When printing, for example, a three page document with two copies each, the collated copy type prints the first, second, and third pages successively and then prints the first, second, and third pages again, while the uncollated copy type prints the first page twice, the second page twice, and then the third page twice. Thus after printing the data, the uncollated copy type has a disadvantage of having to arrange the pages in order while the pages of the collated copy type are already arranged in proper order.

However, though such a conventional collated copy type, as described above, may be convenient due to not requiring the rearranging of the total printed pages, when printing multiple copies of a document, a respective print image is created for each of the first, second and third pages for the first copy and then, after the first printing operation, the respective print images of the first, second and third pages have to be created again in order to print the second copy. Thus, since the print image of each page has to be recreated, there is a disadvantage of taking a long time to complete the print operation.

SUMMARY OF THE INVENTION

The present invention is created to solve such problems. The object of the present invention is to provide a printing device with an increased print speed and method of using such a device to print data in multiple copies when printing data using the collated copy type which does not need page arranging. In the printing device, the original print image created at the beginning of the print process is stored in a storage device, thereby overcoming a decreased print speed.

To achieve the above objects and other advantages, there is provided a printing device to print data in multiple copies comprising a data register unit to set the output mode in order to print data generated at a computer in multiple copies, a data conversion unit to convert the data into an output data, a data storage unit to store the converted output data, a data output unit to print the output data stored in the data storage unit according to an output mode preset in the data register unit and a data control unit which generates a control signal to store the converted data converted in the data conversion unit at the data storage unit, and generates a control signal to print the data stored in the data storage unit at the data output unit according to the output mode set in the data register unit.

Preferably, the output mode is a collated copy type such that the created pages of a document are arranged and printed sequentially. In addition, the output data is a print image made from the data at the data output unit and converted to PCL (Printer Control Language) for print at the data print unit.

Additionally, the present invention provides a method of printing a data in multiple copies comprising steps of determining whether there is data to be printed, setting a number of print copies of the data when a mode is set to print the data in multiple copies, storing a created output information of the data in a storage device after the setting stage, when a command to print the data has been received, checking whether the printed copies correspond to the predetermined number of copies, after printing appropriate pages using the stored output information; and reprinting the predetermined printing pages using the output information, when the printed copies do not correspond to the predetermined copies.

Preferably, the mode to print the multiple copies is a collated copy type such that the data is printed sequentially in the created order. In addition, the output information is a print image made from the data at the data output unit and converted to PCL (Printer Control Language) for print at the printer.

Moreover, the storage device is a hard disk of the computer which is used to store the output information of multiple copies in order to reuse it.

The objectives, characteristics, and advantages of the present invention now will be described in more detail hereinafter with reference to the accompanying drawings, in which preferred embodiment of the invention are shown.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
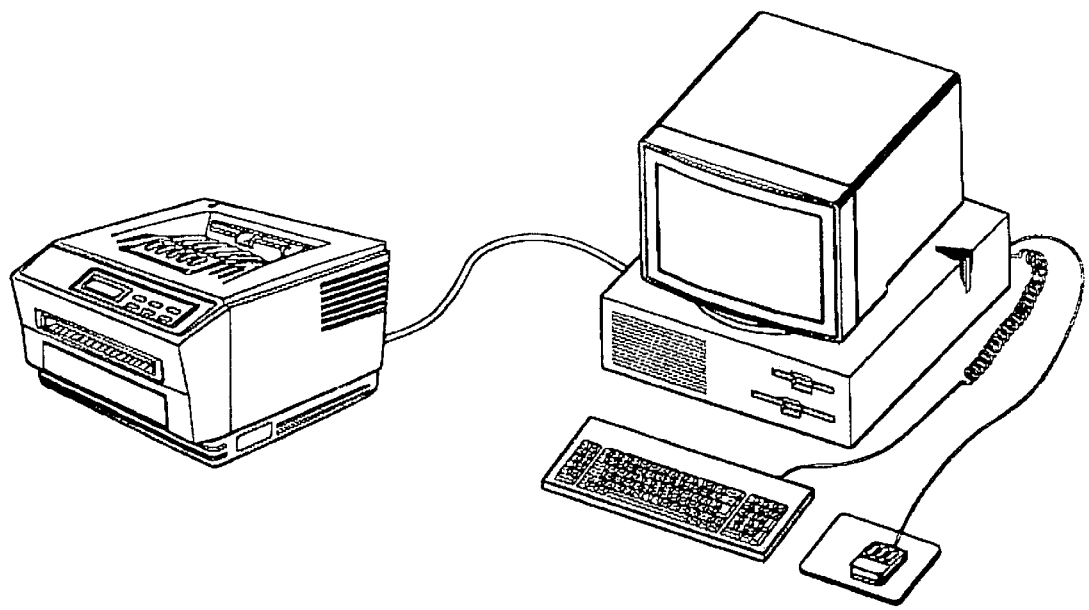
FIG. 1 is a perspective view showing a general connecting condition of a printer and a computer when performing a printing job.

FIG. 1 shows a perspective view of a general connection between computer and printer when a normal printing job is executed; As shown in FIG. 1, a printer is generally used in connection with a computer, and the printer receives data sent from the computer and prints it.

Figure 2:
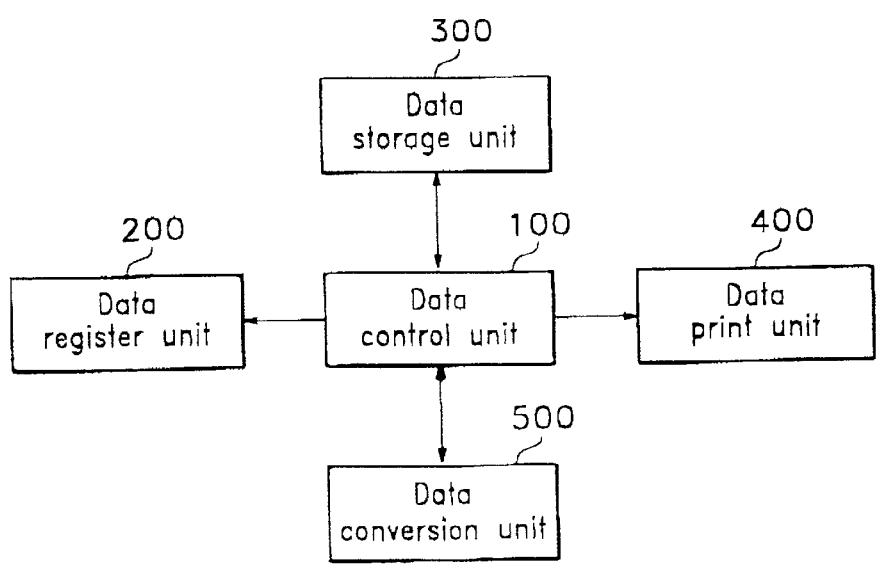
FIG. 2 is a block diagram of a printing device to print the data in multiple copies according to the present invention.
Figure 3:
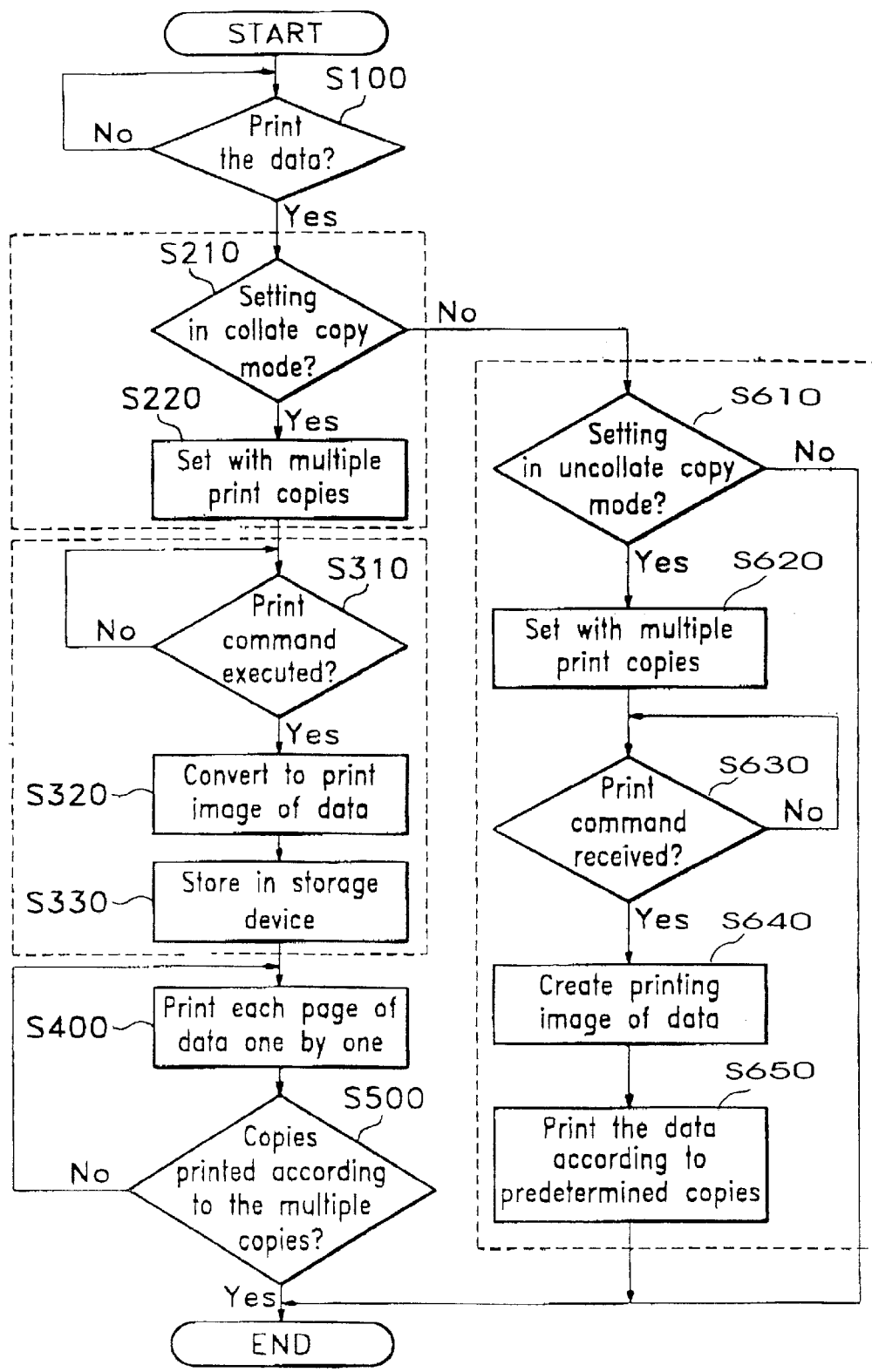
FIG. 3 is a flow diagram of a printing method to print the data in multiple copies according is to the present invention.

FIG. 2 shows a block diagram of a printing device to print the data in multiple copies according to the present invention. A data register unit (200) sets an environment to print the data made in the computer. That is, the data register unit stores information pertaining to various print parameters set by a user for printing a document. Such print parameters including, but not limited to, a collated or uncollated copy mode and a number of copies to be printed. A data storage unit (300) stores the print data generated in the computer, and the data is converted at a data conversion unit (500) to be suitable for printing. A data print unit (400) prints the data stored in the data storage unit (300) according to the environment determined at the data register unit (200). The data conversion unit (500) converts the data made in the computer to a data suitable for printing at the data print unit (400). After the data made in the computer is converted to a suitable form for printing at the data conversion unit (500), a data control unit (100) generates a control signal to store the data made in the computer at the data storage unit (300) and also generates a control signal to print the data at the data output unit (400) which is stored in the data storage unit (300).

The present invention now will be described hereinafter with reference to FIGS. 1–4, in which the printing device for printing the data in multiple copies and the method of using the device to print the data in multiple copies will be described in more detail.

Figure 4:
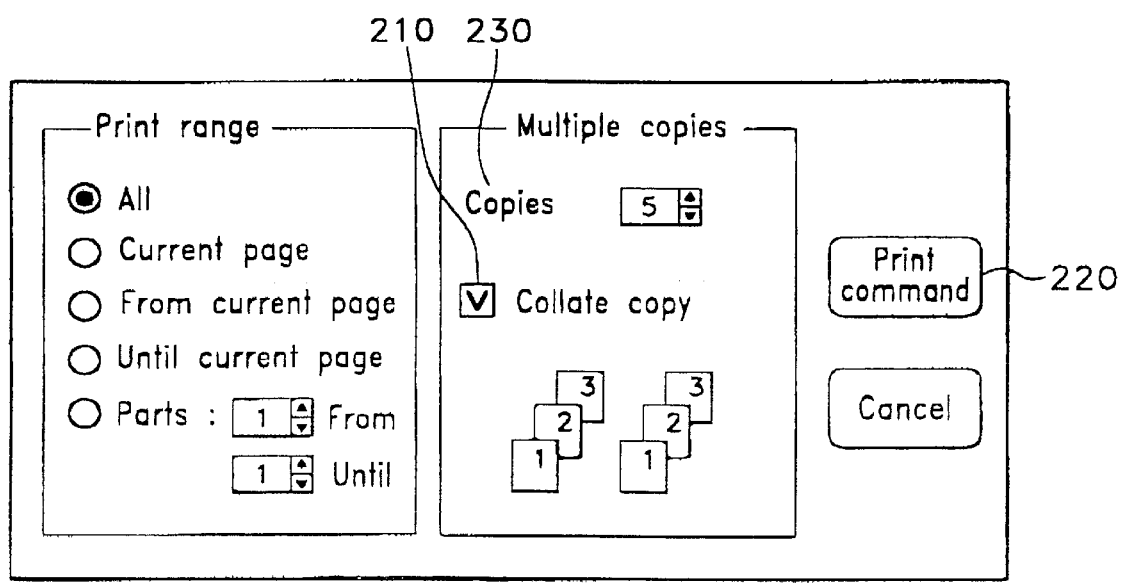
FIG. 4 is an indicative view of setting a number of print copies and a copy mode to print multiple copies of data according to the present invention.

First of all, it is determined whether the data at the data print unit (400), which is made in computer, should be printed (S100). That is, as shown in FIG. 4, the decision is made by checking the data register unit (200) of the computer, to determine whether a print control program to perform a print command has been executed. Then, it is determined whether the mode to print the created data has been set to a collated copy mode (S210). As shown in FIG. 4, it is possible to check the collated copy mode setting by reviewing whether collated copy (210) has been selected. When the collated copy mode is set, a number of print copies (230), shown in FIG. 4, is set according to the quantity desired to print the created data (S220). After setting the number of copies, it is determined whether the command to print the data has been executed (S310). It is possible to execute the print command by activating a print command button (220) shown in FIG. 4. When the print command button (220) is activated a print command is input to the printer and the data conversion unit (500) converts the data from the computer to a printable data suitable for printing at the data print unit (400) (S320). The printable form of data for printing is the print image is made of the PCL (Printer Control Language) in order to convert to the data printable at the data print unit (400). The converted data is stored in the data storage unit (300) (S330). That is, a data storage device of the computer called a hard disk drive is used as the storage device.

The reason for storing the converted data in the hard disk is as follows: Conventionally when printing the data in the collated copy mode, the number of print images of each page of a document created was identical to the number of print copies desired. That is, if multiple copies are set to three, for example, then in order to print the data of one page, three separate print images were created to print the data. The present invention, however, stores the print image on the hard disk when printing multiple copies of data, then the print image stored on the hard disk is referenced for the purpose of printing multiple copies without the need to create additional print images again. After the storage, the stored data is output and printed at the data print unit (400) in the collated copy mode (S400). After printing, it is then determined whether the selected number of copies have been printed (S500). If the selected number of copies have not been printed, the process returns to step S400 to print the next copy. If the selected number of copies have been printed the print operation ends.

On the other hand, when it is determined in step S2 10 that the collated copy mode is not set, then, in step S601, it is determined whether or not the uncollated copy mode is set. If not the print process ends. When the uncollated copy is set the number of print copies is set to the number of copies desired (S620). Then, in step S630, the printer determines whether a print command is received. Once the print command is received, the printer receives the data from the computer and, in step S640, converts the data to a print image in a format (PCL) suitable for printing at the data print unit (400). The print image is then printed in the uncollated copy mode (S650) according to the number of copies set in step S620.

As shown in the above-described, according to the present invention, it is possible to create print image only once when printing the multiple copies of the data made in computer sequentially, thus decreasing the print image creating time which in turn can increase the overall printing speed.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A device of printing a data in multiple copies, comprising:

a data register unit setting an output mode as either a collated mode or an uncollated mode in order to print data, generated in a computer, in multiple copies;

a data conversion unit generating converted data by converting the print data into data suitable to be printed by a print unit;

a data storage unit for storing the converted data, when the output mode corresponds to said collated mode;

a data control unit for generating a storage control signal to store the converted data in the data storage unit, when the output mode corresponds to said collated mode, said data control unit generating a print control signal;

said print unit responding to said print control signal to print multiple copies of the converted data stored in the data storage unit, when the output mode corresponds to said collated mode; and said print unit responding to said print control signal to print multiple copies of the converted data generated by said data conversion unit, without storing said converted data, when the output mode corresponds to said uncollated mode.

2. The device as set forth in claim 1, wherein the converted data is a print image made of PCL (Printer Control Language) which is suitable for printing by the print unit.

3. The device as set forth in claim 1, wherein said data storage unit is a hard disk of said computer.

4. A device of printing a data in multiple copies, comprising:

a data register unit setting a print mode as either a collated mode or an uncollated mode in order to print data, generated in a computer;

a data conversion unit generating converted data by converting the print data into data suitable to be printed by a print unit;

a data storage unit for storing the converted data, when the print mode corresponds to said collated mode;

a data control unit for generating a storage control signal to store the converted data in the data storage unit, when the print mode corresponds to said collated mode, said data control unit generating a print control signal;

said print unit responding to said print control signal to print copies of the converted data stored in the data storage unit, when the print mode corresponds to said collated mode; and said print unit responding to said print control signal to print copies of the converted data generated by said data conversion unit, without storing said converted data, when the print mode corresponds to said uncollated mode.

5. The device as set forth in claim 4, wherein the converted data is a print image made of PCL (Printer Control Language) which is suitable for printing by the print unit.

6. The device as set forth in claim 4, wherein said data storage unit is a hard disk of said computer.

7. The device as set forth in claims 4, wherein said print unit prints multiple copies of the converted data stored in the data storage unit, when the print mode corresponds to said collated mode, and prints multiple copies of the converted data generated by said data conversion unit, when the print mode corresponds to said uncollated mode.

8. A method of printing multiple copies of a document, comprising the steps of:

determining wether data is to be printed in a collated copy mode or an uncollated copy mode;

generating print data by converting the data to a printable format;

printing the print data when it is determined that the data is to be printed in the uncollated copy mode without storing the print data;

storing said print data in a storage device, only when it is determined that the data is to be printed in the collated copy mode and then printing the stored print data according to said collated copy mode.

9. The method as set forth in claim 8, further comprising steps of:

setting a number of print copies of the data when it is determined that the data is to be printed in the collated copy mode;

determining whether said document has been printed according to said number of print copies; and returning to said step of printing the stored print data according to said collated copy mode, when it is determined that said document has not been printed according to said number of print copies.

10. The method as set forth in claim 8, further comprising a step of determining whether a print command has been executed prior to performing said step of generating print data.

11. The method as set forth in claim 8, wherein the storage device is a hard disk of a computer.

12. The method as set forth in claim 8, further comprising steps of:

setting a number of print copies of the data when it is determined that the data is to be printed in the uncollated copy mode;

determining whether a print command has been received; and performing said step of generating print data, when the print command is received, and printing the print data according to the number of print copies in the uncollated copy mode.

* * * * *